Dec. 23, 1969  O. M. ULBING  3,485,259
PRESSURE REGULATING VALVE
Filed July 24, 1967
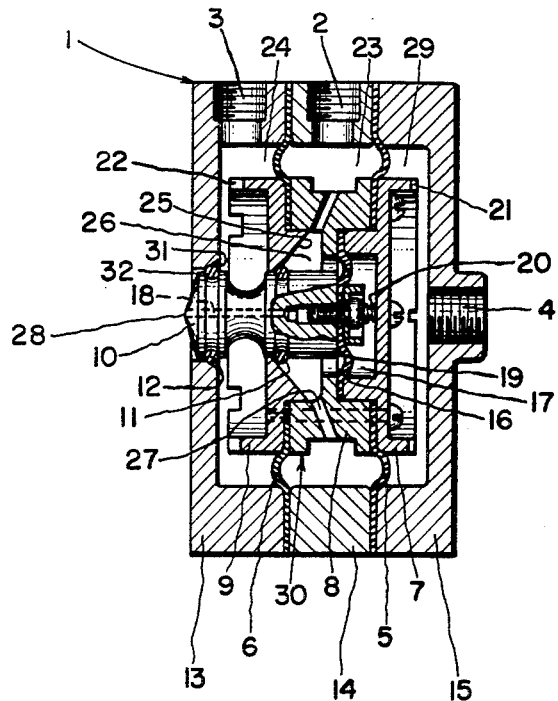
INVENTOR.
OTMAR M. ULBING
BY
AGENT United States Patent Office 3,485,259
Patented Dec. 23, 1969

3,485,259
PRESSURE REGULATING VALVE
Otmar M. Ulbing, Berkshire, N.Y., assignor to Ingersoll-Rand Company, New York, N.Y., a corporation of New Jersey
Filed July 24, 1967, Ser. No. 655,439
Int. Cl. F16k 31/365, 31/385
U.S. Cl. 137—116.3    8 Claims

ABSTRACT OF THE DISCLOSURE

A fluid pressure regulator having a diaphragm assembly and a poppet plug coaxially disposed for cooperative, joined movement, and for independent, relative movement therebetween. The latter movement meters the flow of fluid therethrough, and the former movement exhausts the fluid.

---

This invention pertains to fluid pressure regulating devices, and in particular to such devices of the diaphragm and poppet valve type.

Prior regulators are rather complex structures involving a great plurality of parts, the number of which parts contribute to both their high mortality and expense in manufacture and maintenance. Further, they lack a desirable degree of responsive sensitivity for two reasons at least. For one, the diaphragms used therein present but very limited surfaces to sense and respond to the pressure differentials disposed thereacross. Further, the known regulators feature rather small bleed orifices which limit the exhaust flow capacity. Accordingly, it is an object of this invention to provide a regulator which is markedly simplified and reliable as compared to those known in the prior art. Another object of this invention is to provide a regulator having a high degree of pressure-responsive sensitivity. Yet another object of this invention is to provide a regulator having a high exhaust flow capacity.

A feature of this invention comprises the use of a diaphragm assembly and a poppet plug, the two coaxially disposed for cooperative, joined movement, and for independent, relative movement therebetween.

Another feature of this invention comprises means for displacing a diaphragm assembly valve seat from a poppet plug valve member, to meter the flow of fluid therethrough.

Another feature of this invention comprises means for displacing a poppet plug valve member from a large venting port, to provide for high exhaust flow of fluid.

The foregoing and further objects and features of this invention will become more apparent by reference to the following description, taken in conjunction with the accompanying figure in which: a preferred embodiment of the novel regulator is shown having a housing 1 in which are formed a pressurized-fluid inlet 2 and outlet 3, and a pilot-pressure control input connection 4. Instead of controlling the regulator output with a fluid pilot pressure according to the present embodiment, other variable-biasing arrangements could be used. For example, a spring having means for adjusting the biasing thereof could serve the same purpose. Other arrangements which could be provided to satisfy a similar function, all within the spirit of my invention, will occur to those skilled in the art.

Diaphragms 5 and 6 chamber the housing 1, and contain the live pressurized fluid. The diaphragms 5 and 6 supported within the housing by a control disc 7, a spacer ring 8, and a valve disc 9. A poppet plug 10 carries O-rings 11 and 12 which seal against valve disc 9 and an exhaust shell 13, respectively. The outer peripheries of the diaphragms 5 and 6 are supported by the exhaust shell 13, an inlet spacer 14 and a control shell 15. A diaphragm 16 isolates a space 17 from the live pressurized fluid, and a passage 18 formed through the axial center of poppet plug 10 admits ambient pressure into space 17. This latter provision is to prevent the poppet plug 10 from being pressure-biased, since the effective area exposed by diaphragm 16 is equal to an area 19 of the poppet plug 10 which is exposed to the live pressurized fluid.

A spring 20 exerts a slight closing force on poppet plug 10, with the regulator in a quiescent or static state. Discs 7 and 9 also serve as displacement limiters for the diaphragms 5 and 6. Slots 21 and 22, formed in discs 7 and 9, respectively, permit free flow therethrough despite a maximum displacement of the components, discs 7 and 9 and spacer ring 8, carried by diaphragms 5 and 6.

Diaphragms 5 and 6, in cooperation with spacer ring 8 and inlet spacer 14, form a first chamber 23 in housing 1 with which inlet 2 is in communication. Diaphragm 6, in cooperation with valve disc 9 and exhaust shell 13, forms a second chamber 24 in housing 1 with which outlet 3 is in communication.

A valve seat 25, formed centrally in valve disc 9, receives the O-ring 11 valve member of poppet plug 10. Thus, valve seat 25, spacer ring 8, and diaphragm 16 form a third chamber 26. Third chamber 26 is coaxial with, and contained within, first chamber 23; passages 27 formed in spacer ring 8 communicate therebetween, and advance the pressurized fluid to valve seat 25.

Between diaphragm 16 and control disc 7 is formed a fourth chamber, this being the space 17 mentioned earlier. Space 17 is maintained at ambient pressure via the passage 18 formed axially in poppet plug 10, the passage having an external orifice 28 on the outer end thereof.

A fifth chamber 29 is formed by diaphragm 5 in cooperation with control disc 7 and control shell 15. The pilot pressure control input connection 4 communicates therewith for the purpose of moving the unitized diaphragm assembly 30, including diaphragms 5 and 6, discs 7 and 9, and spacer ring 8, between control shell 15 and exhaust shell 13.

Finally, O-ring 12, mounted on poppet plug 10, mates with a valve seat 31 formed in the exhaust port 32 to seal the latter.

In operation, pressurized fluid is addressed to the first chamber 23 via inlet 2 for communication with second chamber 24 and outlet 3. A certain pilot pressure is likewise admitted to the regulator via the pilot pressure input connection 4; this pilot pressure moves the diaphragm assembly 30 toward the exhaust shell 13. Since O-ring 12 is seated on valve seat 31, poppet plug 10 is unable to move. The only resulting motion, then, is that of valve disc 9, and other diaphragm assembly components carried therewith, relative to poppet plug 10. This motion removes valve seat 25 from O-ring 11 and allows the inlet fluid to pass to outlet 3. When the outlet pressure reaches the desired level it returns the diaphragm assembly 30, causes valve seat 25 to seal about O-ring 11, and outlet flow ceases. Should the pressure at the outlet 3 exceed what is desired, the diaphragm assembly 30 will be displaced toward the control shell 15 to effect a venting of the excess pressure. Displacement of the diaphragm assembly toward the control shell, carries the poppet plug 10 therewith. Accordingly, O-ring 11 maintains a closure of valve seat 25, sealing between the inlet 2 and the outlet 3. However, this carriage of the poppet plug 10 removes O-ring 12 from valve seat 31, permitting the second chamber 24 to vent via exhaust port 32.

The diaphragms 5 and 6 present broad surfaces to both first and second chambers 23, 24. Thus, they are highly sensitive and responsive to the pressure differentials therebetween. Exhaust port 32 offers a great aperture for rapid exhausting or unloading of pressure from the second chamber 24. Further, my regulator is of very simple construction, requiring only a housing 1, diaphragm assembly 30, and poppet plug 10 for the principal functional components. Acordingly, my disclosure teaches a novel regulator structure providing singular and responsive operation and requiring but patently simple fabrication.

I claim:

1. A regulator, for controlling pressurized fluid, comprising:
a housing; inlet means and outlet means, formed in said housing, for the pressurized fluid; a plurality of chambers formed within said housing; said inlet means communicating with a first chamber of said plurality; said outlet means communicating with a second chamber of said plurality; valving means disposed between said first and second chambers for controlling communication therebetween; said valving means including a valve member and a displaceable valve seat for mating therewith; and means coupled to said valve seat for displacing the same from said valve member to communicate said first and second chamber; said displacing means comprise disc means fixed to said displaceable valve seat; and means disposed adjacent to said disc means for translating the latter; said translating means comprise a third chamber of said plurality, and means formed in said housing for introducing a pilot, pressurized fluid to said third chamber 2. A regulator, according to claim 1, further comprising a fourth chamber of said plurality, disposed coaxially of said first chamber, for communicating the latter with said second chamber.

3. A regulator, according to claim 1, wherein: said valve member is displaceable from said exhaust port to provide for communication of said second chamber with said exhaust port.

4. A regulator, according to claim 2, further comprising: a fifth chamber of said plurality, and means exposing said fifth chamber to ambient fluid pressure.

5. A regulator, according to claim 4, wherein; said exposing means comprise an axial passageway formed in said valve member.

6. A regulator, for controlling pressurized fluid, comprising: a housing; inlet means and outlet means, formed in said housing, for the pressurized fluid; a plurality of chambers formed within said housing; said inlet means communicating with a first chamber of said plurality; said outlet means communicating with a second chamber of said plurality; valving means disposed between said first and second chambers for controlling communication therebetween; said valving means including a valve member and a displaceable valve seat for mating therewith; means coupled to said valve seat for displacing the same from said valve member to communicate said first and second chambers; and an exhaust port formed in said housing; said valving means further including means for sealing and opening said exhaust port; and wherein said valve member is displaceable from said exhaust port, to provide for exhausting of pressurized fluid therethrough.

7. A regulator, according to claim 6, wherein: said valving means further include biasing means for urging said valve member into mating engagement with said displaceable valve seat.

8. A regulator, according to claim 6, wherein: said means for sealing and opening said exhaust port are carried by said valving means.

References Cited

UNITED STATES PATENTS 2,940,462   6/1960   Johanson _____ 137—508

WILLIAM F. O'DEA, Primary Examiner
HOWARD M. COHN, Assistant Examiner

U.S. Cl. X.R.
137——505.18, 505.25